(12) United States Patent
Dhole

(10) Patent No.: US 11,866,950 B2
(45) Date of Patent: Jan. 9, 2024

(54) DEVICE FOR IMPACTING ATMOSPHERE BY ELECTRONS

(71) Applicant: OMAYUR TECHNOLOGIES PRIVATE LIMITED, Mumbai (IN)

(72) Inventor: Dhananjay Pravin Dhole, Pune (IN)

(73) Assignee: OMAYUR TECHNOLOGIES PRIVATE LIMITED, Mumbai (IN)

( * ) Notice: Subject to any disclaimer, the term of this patent is extended or adjusted under 35 U.S.C. 154(b) by 315 days.

(21) Appl. No.: 17/431,689

(22) PCT Filed: Feb. 14, 2020

(86) PCT No.: PCT/IB2020/051246
§ 371 (c)(1),
(2) Date: Aug. 17, 2021

(87) PCT Pub. No.: WO2020/170096
PCT Pub. Date: Aug. 27, 2020

(65) Prior Publication Data
US 2022/0136274 A1     May 5, 2022

(30) Foreign Application Priority Data
Feb. 18, 2019   (IN) .............................. 201921006233

(51) Int. Cl.
*A01G 15/00* (2006.01)
*E04H 12/10* (2006.01)
(Continued)

(52) U.S. Cl.
CPC ............. *E04H 12/10* (2013.01); *A01G 15/00* (2013.01); *E04H 12/20* (2013.01); *E04H 12/24* (2013.01)

(58) Field of Classification Search
CPC .......... A01G 15/00; E04H 12/20; E04H 12/24
See application file for complete search history.

(56) References Cited

U.S. PATENT DOCUMENTS

| 2,815,395 A | 12/1957 | Donelli |
| 4,039,739 A | 8/1977 | Donelli |

(Continued)

FOREIGN PATENT DOCUMENTS

| CN | 106368495 | 2/2017 |
| EA | 030097 | 6/2018 |

(Continued)

OTHER PUBLICATIONS

International Search Report received in PCT/IB2020/051246, dated Aug. 6, 2020, 3 pages.

(Continued)

*Primary Examiner* — Jue Zhang
*Assistant Examiner* — Afework S Demisse
(74) *Attorney, Agent, or Firm* — Klarquist Sparkman, LLP

(57) ABSTRACT

A system (10) for modifying atmospheric conditions is disclosed. The system (10) comprises a tower (20), at least one first rod (42) and at least one second rod (62), each of the at least one first rod (42) and the at least one second rod (62) coupled to the tower (20) to extend from the tower (20) and define an end distal (46, 66) from the tower (20), wherein the at least one second rod (62) is spaced apart from the at least one first rod (42) along a height ($H_T$) of the tower (20). The system (10) further includes a first set of emission wires (70) extending between the end (46) of the at least one first rod (42) and the end (66) of the at least one second rod (62).

10 Claims, 3 Drawing Sheets

(51) Int. Cl.
*E04H 12/20* (2006.01)
*E04H 12/24* (2006.01)

(56) References Cited

U.S. PATENT DOCUMENTS

| | | |
|---|---|---|
| 5,678,783 A | 10/1997 | Wong |
| 5,789,749 A | 8/1998 | Breton |
| 6,735,830 B1 | 5/2004 | Mercier |
| 7,965,488 B2 | 6/2011 | Kaufman |
| 8,988,847 B2 | 3/2015 | Bologurov et al. |
| 2008/0283386 A1* | 11/2008 | Kaufman ............... H01Q 1/366 422/186.04 |
| 2011/0174892 A1* | 7/2011 | Fluhrer ............... A01G 15/00 239/14.1 |
| 2014/0041314 A1 | 2/2014 | Amir |
| 2015/0162854 A1 | 6/2015 | Blaunshtein et al. |
| 2015/0295392 A1 | 10/2015 | Ma et al. |

FOREIGN PATENT DOCUMENTS

| | | |
|---|---|---|
| KR | 101088770 B1 | 12/2011 |
| RU | 2034315 C1 | 4/1995 |
| RU | 2060639 C1 | 5/1996 |
| RU | 2105463 C1 | 2/1998 |
| RU | 2012117745 A | 12/2013 |
| RU | 2673186 C1 | 11/2018 |

OTHER PUBLICATIONS

Written Opinion received in PCT/IB2020/051246, dated Aug. 6, 2020, 6 pages.

* cited by examiner

DEVICE FOR IMPACTING ATMOSPHERE BY ELECTRONS

CROSS REFERENCE TO RELATED APPLICATIONS

This is the U.S. National Stage of International Application No. PCT/IB2020/051246, filed Feb. 14, 2020, which was published in English under PCT Article 21(2), which in turn claims the benefit of India Application No. 201921006233, filed in India on Feb. 18, 2019. Both applications are incorporated by reference herein in their entirety.

TECHNICAL FIELD OF THE INVENTION

The present disclosure relates to a system for modifying atmospheric conditions by artificial stimulation of electric forces exerted on and between particles of atmosphere such as aerosols, molecular clusters, and water molecules possessing their own electric charge to increase or limit precipitation, eliminate air pollution, strengthen or weaken the wind in controlled area.

BACKGROUND OF THE INVENTION

Numerous methods for modifying atmospheric conditions, such as electric charge of the atmosphere, have been developed and used with various degrees of success. To change or modify the electrical charge of the atmosphere, a device which emits electrons into the atmosphere is used. Such device includes a high voltage DC power source and an antenna in the form of thin wires stretched obliquely according to a certain scheme, at which a maximum electrons are released into the atmosphere for a given wire length. The device has a limitation as a relatively large area is required for the placement of the antenna, and the danger to pedestrians and technical means due to the proximity of wires under high voltage. Finding a site for installation of such device in a city or in place with space deficiency could be difficult. Further, the large area needs fencing and round-the-clock security.

There also exists a device with a single support tower, on which emission wires are stretched obliquely and radially in the form of edges of an umbrella. The antenna consists of a single support tower, from an upper point of which the emission wires radially and/or obliquely diverge, terminating at free ends of several horizontal rods fixed radially at the same level at a certain height of the tower. The limitation of the device is that for the stretching of the emission wires, only one level of fixing of the horizontal rods is employed, and the emission wires are stretched radially from the support tower. At distances along the emission wire, from the upper point of attachment, less than a certain distance, the emission wires converge to the value at which the emission of electrons ceases and all the emission wires operate as a single wire. This effect occurs on high-voltage power lines to reduce electron emission (corona discharge) to the atmosphere. Because of the proximity of the emission wires near the upper point of the tower, some of the lengths of the emission wires is not utilized and the emissivity of the device is lowered.

SUMMARY OF THE INVENTION

In an aspect of the invention, a system for modifying atmospheric conditions is disclosed. The system comprises a tower and at least one first rod and at least one second rod. Each of the first rod and second rod coupled to the tower to extend from the tower and define an end distal from the tower. The at least one second rod is positioned spaced apart from the at least one first rod along a height of the tower. The system further includes a first set of emission wires extending between the end of the at least one first rod and the end of the at least one second rod. Also, in an embodiment, a length of the at least one first rod is equal to a length of the at least one second rod.

In an embodiment of the invention, the at least one first rod corresponds to a plurality of first rods coupled to the tower to extend from the tower and the end of each of the plurality of first rods is defined in a first plane. Similarly, the at least one second rod corresponds to a plurality of second rods coupled to the tower to extend from the tower and the end of each of the plurality of second rods is defined in a second plane spaced apart from the first plane. In a further embodiment, the first plane is parallel to the second plane.

In another embodiment of the invention, the system further includes a second set of emission wires extending between the ends of two adjacent rods of the plurality of first rods, and a third set of emission wires extending between the ends of two adjacent rods of the plurality of second rods.

In yet another embodiment, the system includes a fourth set of emission wires extending from one or more emission wires of the second set of emission wires to one or more emission wires of the third set of emission wires.

In a further embodiment, the at least one first rod and the at least one second rod are perpendicular to the height of the tower, in an extended state of each of the at least one first rod and the at least one second rod with respect to the tower.

Also, in another embodiment, the first set of emission wires extend between the end of the at least one first rod and the end of the at least one second rod to be parallel to the height of the tower.

In yet further embodiment, the system includes a power source, and a control unit coupled to the power source and adapted to control the power source to supply voltage to the first set of emission wires.

DETAILED DESCRIPTION OF THE DRAWINGS

The present disclosure relates to a system for modifying atmospheric conditions by artificial stimulation of electric forces exerted on and between particles of atmosphere. A system 10 having a tower electrically coupled to an outer peripheral portion framed around the tower is employed to alter the number of electrons in the atmosphere. In an embodiment, the antenna is employed to increase or decrease the electrization of the atmosphere.

Figure 1:
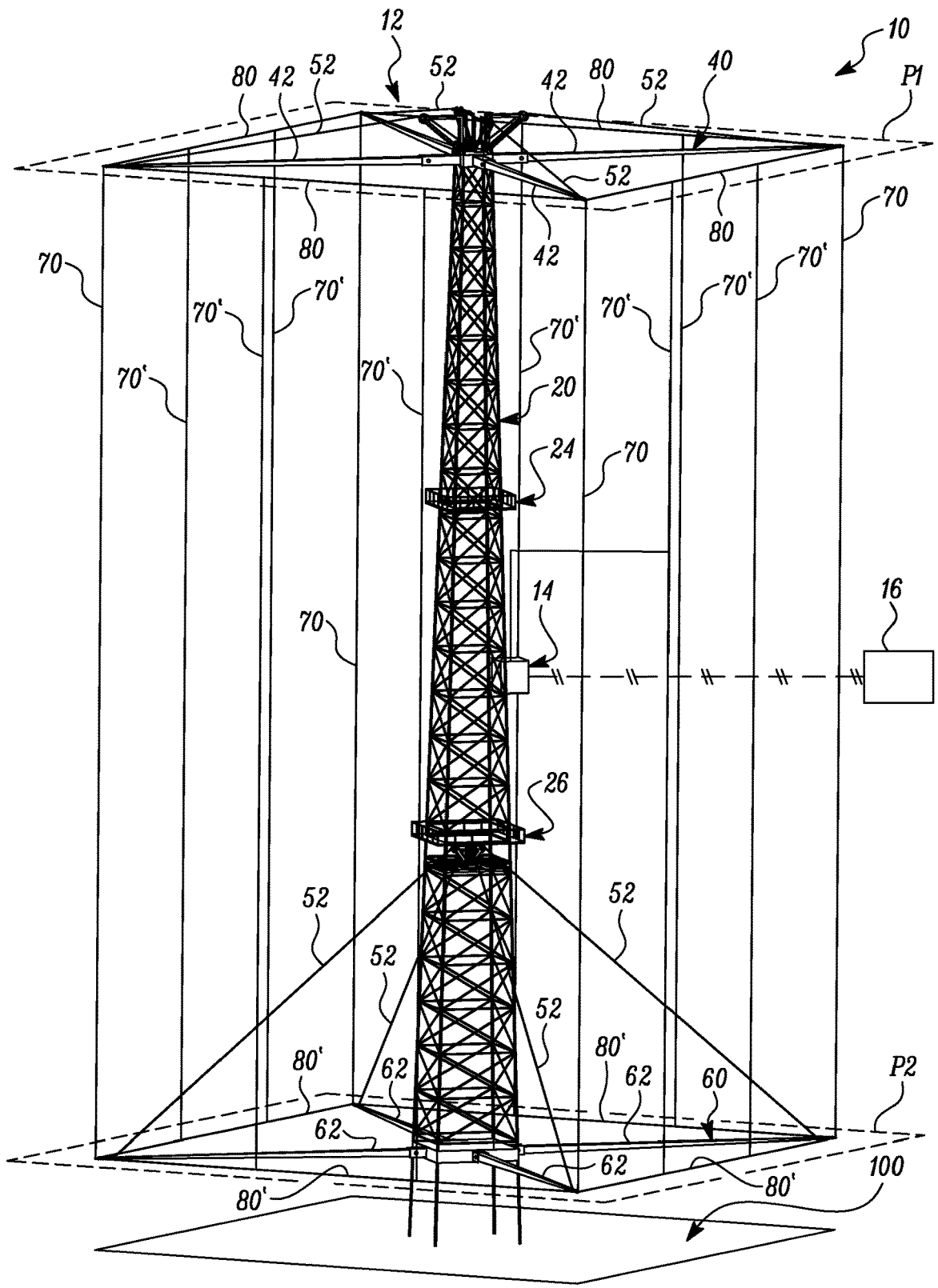
FIG. 1 illustrates a perspective view of a system for impacting atmosphere by electrons, in accordance with an embodiment of the present disclosure.

FIG. 1 is an exemplary diagram of the system 10 for controlling the level of electrization of the atmosphere in accordance with the present disclosure. The system 10 may include an antenna 12, a power source 14, and a control unit 16. The system 10 may be configured to receive meteorological data, such as pollution levels (AQI), air relative humidity and air absolute humidity, air pressure, air temperature, wind direction and wind speed, etc., from a weather station. The system 10 may further include a memory associated with the control unit 16, and the memory may be configured to store the meteorological data of the past 5 to 10 years. The system 10 may further use the stored meteorological data to determine historical average meteorological data (5 to 10 previous years).

The meteorological data provides weather data obtained from weather stations operational in the vicinity of the system 10 as well as from weather satellites. In this manner, the meteorological data can provide an indicator of current atmospheric conditions and an indicator of predicted future atmospheric conditions. As such, use of the meteorological data helps facilitate an increase or decrease in the emission of electrons from the antenna 12 into the atmosphere to modify the atmospheric conditions. Further, in an embodiment, an operator may provide input to the control unit 16 to control the power source 14, and, hence the level of the emission or absorption of electrons to or from atmosphere. The control unit 16 provides control modes to the power source 14 based on a signal from the operator, which is the result of a decision made based on analysis of the meteorological data, by the operator to increase or decrease the electrization of the atmosphere to the desired level.

The power source 14 is coupled to the antenna 12, via emission wires, to supply voltage to the antenna 12 and to control emission or absorption of electrons by the antenna 12. In this manner, when the antenna 12 is under voltage, either positive or negative, the antenna 12 emits or absorbs electrons into or from the atmosphere and, in turn, negatively or positively charges the atmosphere. In an embodiment, the voltage supplied to the antenna 12 by the power source 14 is DC (direct current) with voltages ranging from (−80 to +80 kV) and current ranging from 0 to about 5 micro Amperes. One suitable low-range voltage value and current value for operating the antenna 12 is about 70 KV and 2 mA. The power source 14 may be contained in an insulated container, and the insulated container containing the power source 14 may be mounted on the antenna 12 at a height H sufficient for the safe passage of pedestrians and traffic, and the height H may vary from 7 m to 10 m, above a ground 100. The structure of the antenna 12 will be described below in more detail with reference to FIGS. 1 to 3.

Figure 2:
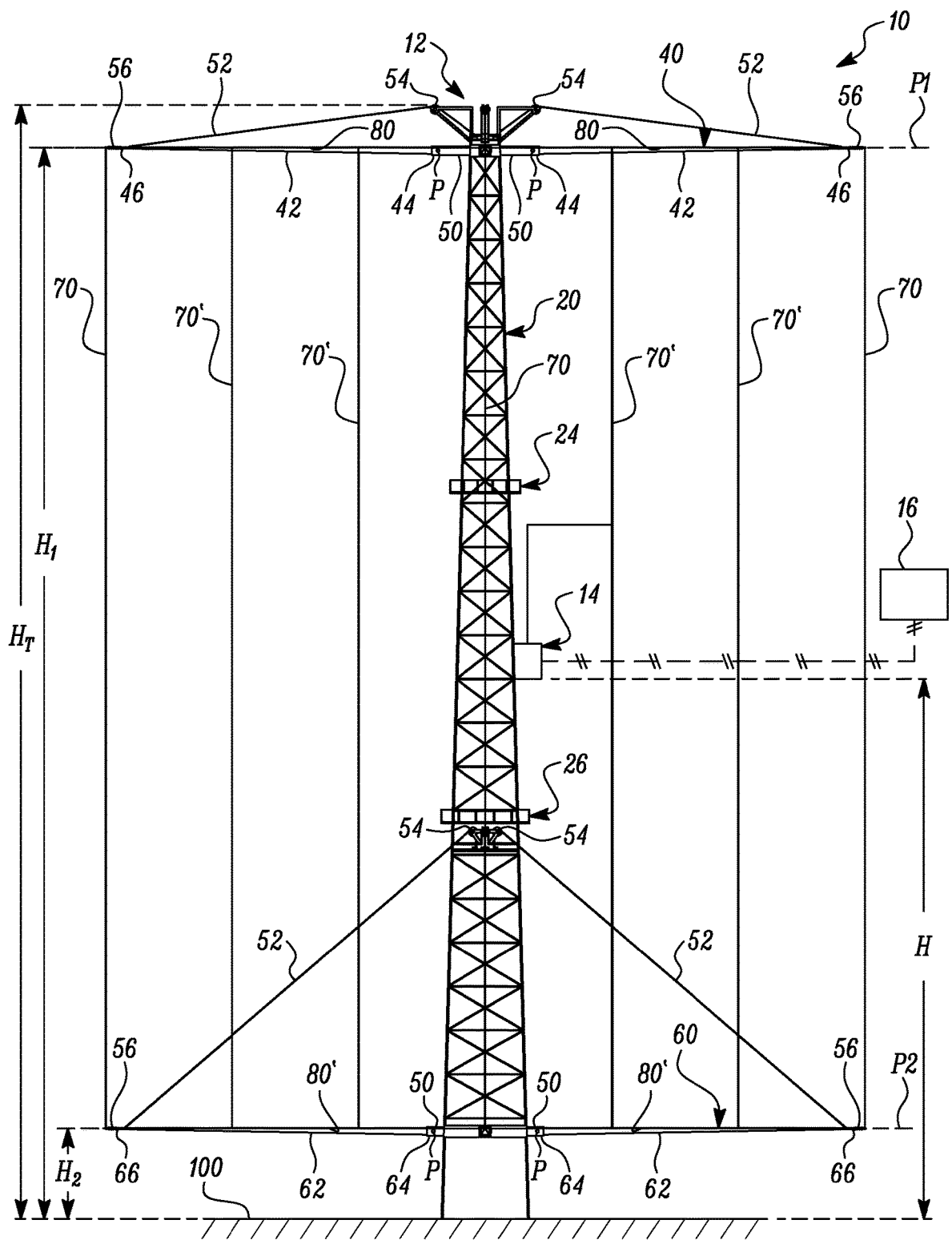
FIG. 2 is a front view of the system, in accordance with an embodiment of the present disclosure.
Figure 3:
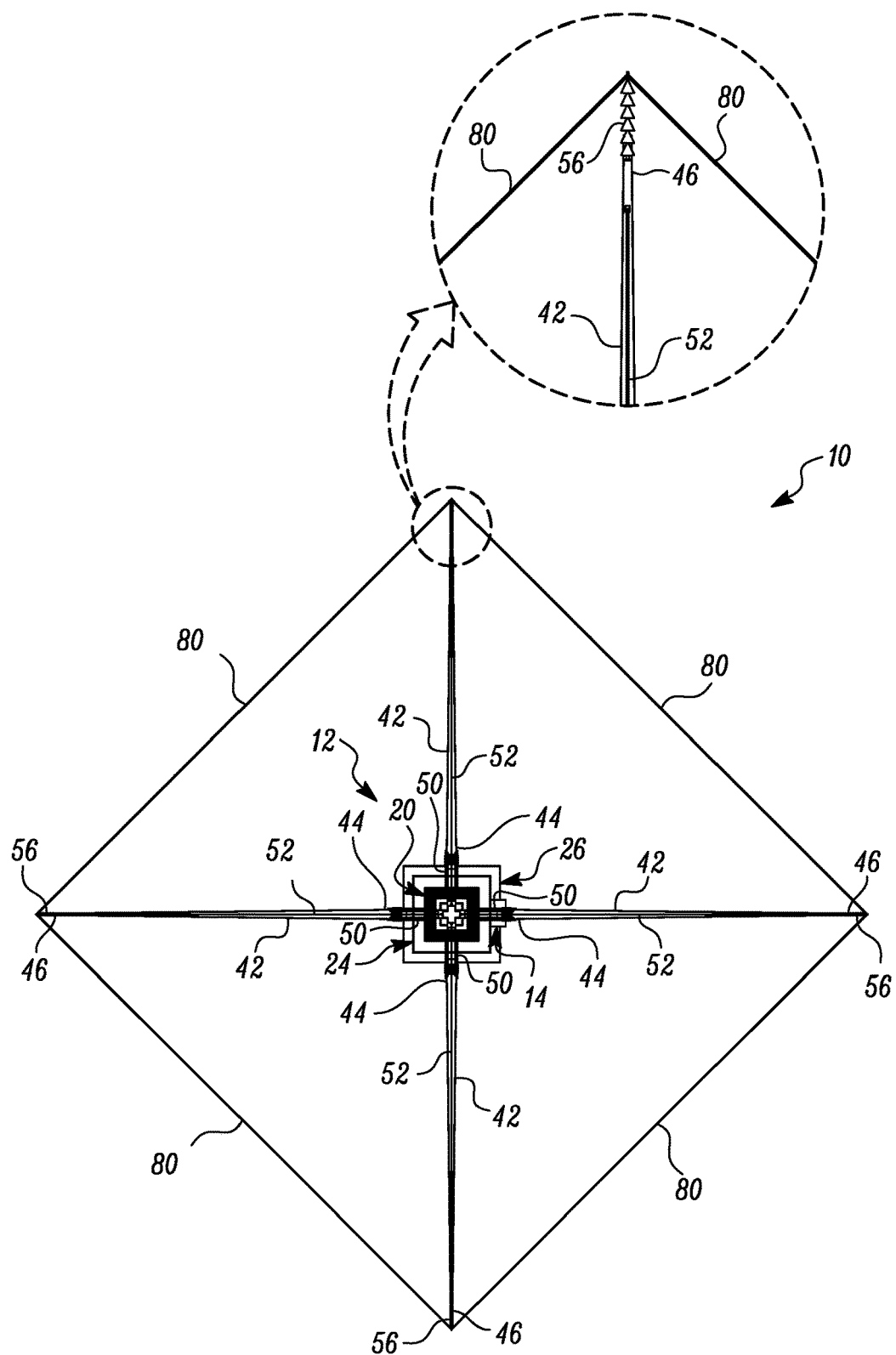
FIG. 3 is a top view of the system with an enlarged portion depicting components of the system, in accordance with an embodiment of the present disclosure.

Referring to FIGS. 1, 2 and 3, the antenna 12 includes a tower 20 mounted on the ground 100. Alternatively, the tower 20 may be mounted on the ground 100 via a foundation structure (not shown). The foundation structure may be configured to secure the tower 20 in a vertical direction using one or more fasteners. Exemplary fasteners to couple the tower 20 to the foundation structure may include bolts, screws, various steel bars, and other suitable fasteners. In an embodiment, the tower 20 may be formed by assembling a plurality of blocks 22. Each of the plurality of blocks 22 may have any suitable configuration, such as cube, cuboidal, or the like. In case, the tower 20 is formed by assembling a plurality of cubes, a cross section of each of the plurality of block is a square cross section.

The antenna 12 may include a first platform 24 and a second platform 26 disposed on the tower 20. The first platform 24 may be disposed above the second platform 26 on the tower 20. The first platform 24 and the second platform 26 may provide a structure where one or more operators can stand to carry out a repair work in the antenna 12. In an embodiment, the first platform 24 and the second platform 26 may be any structure formed of one or more planks disposed around the tower 20, as shown in FIG. 1.

The structure of the first platform 24 and the second platform 26 may further include a fence or a support formed around the tower 20 for safety of the mechanic or the operator standing on the first platform 24 or the second platform 26. The first platform 24 and the second platform 26 may be made of any material, for example wood, cast iron or the like, depending upon the weight and the strength of the material.

The antenna 12 may further include a first structure 40 and a second structure 60. The first structure 40 may be formed of at least one first rod 42 coupled to the tower 20 to extend from the tower 20. Similarly, the second structure 60 may be formed of at least one second rod 62 coupled to the tower 20 to extend from the tower 20. In an embodiment, the at least one first rod 42 may correspond to a plurality of first rods 42 coupled to the tower 20 to extend from the tower 20 and the at least one second rod 42 may correspond to a plurality of second rods 62 coupled to the tower 20 to extend from the tower 20. In an embodiment, the plurality of first rods 42 of the first structure 40 and the plurality of second rods 62 of the second structure 60 may be coupled to the tower 20 so as to form a polygonal configuration from a top view of the antenna 12 (for example, see FIG. 3). The polygonal configuration of the first structure 40 and the second structure 60 may be limited by a number N of plurality of first rods 42 and the plurality of second rods 62 forming each of the first structure 40 and the second structure 60. The first structure 40 and the second structure 60 may take any suitable configuration, for example, a triangular configuration when the number N of the first and second rods 42, 62 is 3 or a hexagonal configuration when the number N of the first and second rods 42, 62 is 6 or an octagonal configuration when the number N of first and second rods 42, 62 is 8. In an embodiment, each of the first structure 40 and the second structure 60 is of a square configuration where the number N of the first and second rods 42, 62 is 4. In an embodiment, the plurality of first rods 42 and the plurality of second rods 62 may form diagonals of the polygonal configuration.

The at least one first rod 42 may include a first end 44 disposed proximal to the tower 20, and a second end 46 disposed distal from the tower 20. In the embodiment where the at least one first rod 42 corresponds to the plurality of first rods 42, each of the plurality of first rods 42 may include a first end 44 disposed proximal to the tower 20, and a second end 46 disposed distal from the tower 20. The second ends 46 of the plurality of first rods 42 are defined in a first plane P1. In an embodiment, the first plane P1 is parallel to the ground 100.

Similarly, the at least one second rod 62 may include a first end 64 disposed proximal to the tower 20, and a second end 66 disposed distal from the tower 20. In the embodiment where the at least one second rod 62 corresponds to the plurality of second rods 62, each of the plurality of second rods 62 may include a first end 64 disposed proximal to the tower 20, and a second end 66 disposed distal from the tower 20. The second ends 66 of the plurality of second rods 62 are defined in a second plane P2. In an embodiment, the second plane P2 is parallel to the first plane P1.

In an embodiment, a length L of the at least one first rod 42 of the first structure 40 may be equal to a length L of the at least one second rod 62 of the second structure 60. In an alternate embodiment, the length L of the at least one rod 42 of the first structure 40 may be different from the length L of the at least one second rod 62 of the second structure 60. In an exemplary embodiment, the lengths L of the first and second rods 42, 62 of the first and the second structure 40, 60 may vary from 16 m to 24 m.

The first structure 40 and the second structure 60 may be coupled to the tower 20 at two different levels above the ground 100, i.e., at two different heights above the ground 100. In an embodiment, the at least one first rod 42 of the first structure 40 may be spaced apart from the at least one second rod 62 of the second structure 60 along a height $H_T$ of the tower 20. In an exemplary embodiment, the first structure 40 or the at least one first rod 42 may be coupled to the tower 20 at a height H1 above the ground 100, and the second structure 60 or the at least one second rod 62 may be coupled to the tower 20 at a height H2 above the ground 100. The height H1 may be more that the height H2 (i.e., H1>H2). In an embodiment, the height H2 of the second structure 60 or the at least one second rod 62 may be sufficiently above the ground 100 to allow sufficient space for the safe passage of pedestrians and traffic under the second structure 60. The height H1 of the first structure 40 may vary from 54 m to 81 m, above the ground 100, and the height H2 of the second structure 60 may vary from 7 m to 9 m, above the ground 100.

Each of the first rod 42 of the first structure 40 and each of the second rod 62 of the second structure 60 may be coupled to the tower 20, via the first end 44 and the first end 64, respectively, using a pivoting structure 50 mounted on the tower 20. Each of the first rod 42 and each of the second rod 62 may be coupled to the pivoting structure 50 using a pin P, which may facilitate a pivotal movement of the each of the first and second rods 42, 62 with respect to the pivoting structure 50.

The antenna 12 may further include one or more cable support members 52, which may be configured to couple each of the first rod 42 and each of the second rod 62 on the tower 20. The cable support member 52 may be a string or a rope, one end of which is coupled to the tower 20 and the other end is coupled to the second end 46, 66 of the at least one first and second rod 42, 62, respectively, thereby fixing the at least one first and second rods 42, 62 to the tower 20. The cable support members 52 may hold the at least one first and second rods 42, 62 in a horizontal position during a working state or an extended state of the system 10, and in a vertical position during a repair state of the system 10. The working state or the extended state of the system 10 may correspond to a state in which the antenna 10 is employed to increase or decrease the electrization of the atmosphere, and the repair state may correspond to a state in which the rods are articulated around the pin P and are retracted to generally align along the height $H_T$ of the tower 20 to fall in access to operators/technicians who may perform the repair or maintenance work on the system 10. When the defective rod is to be repaired, said rod may be pivoted around the pin P, from the horizontal position to the vertical position, by either loosening or tightening the cable support members 52 around winches 54 mounted on the tower 20. In an embodiment, each of the first and second rods 42, 62 may be pivoted from the horizontal position to the vertical position independently of the other. The extended state of the system 100 may also correspond to a state in which each of the first rod 42 and the second rod 62 are perpendicular to the height $H_T$ of the tower 20.

In an embodiment, the at least one first rod 42 may be moved to the vertical position so that an operator may repair a defective rod (for example, rod 42) from the first platform 24, and the at least one second rod 62 may be moved to the vertical position so that the operator may repair a defective rod (for example, rod 62) from the second platform 26.

The antenna 12 may further include a plurality of insulators 56 coupled to the first structure 40 and the second structure 60 of the antenna 12 as extensions. For example, one insulator 56 may be coupled to one first rod 42 of the first structure 40. In an embodiment, the insulators 56 may be coupled to the second end 46 of the at least one first rod 42 of the first structure 40. For instance, if there are 4 first rods 42 in the first structure 40, then each first rod 42 of the first structure 40 may be coupled to a respective insulator 56 at the second end 46. A similar configuration may be contemplated for the second structure 60.

The insulators 56 may be a post or suspension and may be composed of a single insulators of any shape and configuration, for example disc, conical, etc., and may be made of any material which does not allow electricity to pass through the insulator 56, for example, glass, porcelain or composite polymer materials, ceramic, plastic, etc.

The antenna 12 may further include a first set of emission wires 70 extended along the height $H_T$ of the tower 20, i.e., the first set of emission wires 70 may extend between the first structure 40 and the second structure 60. The first set of emission wires 70 may extend from the second end 46 of the at least one first rod 42 to the second end 66 of the at least one second rod 62. The first set of emission wires 70 may extend from the insulator 56 coupled to the at least one rod 42 to the insulator 56 of the at least one second rod 62. In an embodiment, the first set of emission wires 70 may extend from the second end 46 of the at least one first rod 42 to the correspondingly and vertically disposed second end 66 of the at least one second rod 62 such that the first set of emission wires 70 is parallel to the height $H_T$ of the tower 20.

The antenna 12 may further include a second set of emission wires 80 extending along a periphery of the first structure 40. The second set of emission wires 80 may extend from the second end 46 of one first rod 42 to the second end 46 of the adjacent first rod 42 of the first structure 40. In an embodiment, the second set of emission wires 80 may extend between the insulators 56 coupled to the first rods 42 of the first structure 40.

Similarly, the antenna 12 may further include a third set of emission wires 80' extending along a periphery of the second structure 60. The third set of emission wires 80' may extend from the second end 66 of one second rod 62 to the second end 66 of the adjacent second rod 62 of the second structure 60. In an embodiment, the third set of emission wires 80' may extend between the insulators 56 coupled to the second rods 62 of the second structure 60.

The antenna 12 may further include a fourth set of emission wires 70' extending from one or more emission wires 80 of the second set of emission wires 80 to one or more emission wires 80' of the third set of emission wires 80', as shown. Also, in an embodiment, the first set of emission wires 70, the second set of emission wires 80, the third set of emission wires 80' and the fourth set of emission wires 70' may correspond to one or more first emission wires 70, one or more second emission wires 80, one or more third emission wires 80' and one or more fourth emission wires 70', respectively.

The first set of emission wires 70, the second set of emission wires 80, the third set of emission wires 80' and the fourth set of emission wires 70' may be made of a steel cable or wire, for example solid stainless steel wire or stranded stainless steel wire or cable, which in an exemplary embodiment is approximately 0.5 mm to 2.0 mm in diameter. The solid stainless steel cable and the stranded stainless steel cable are exemplary wires for implementing the system 10. One ordinarily skilled in the art will appreciate that the material of the first set of emission wires 70, the second set of emission wires 80, the third set of emission wires 80' and the fourth set of emission wires 70' is not limited to stainless steel cable or wire, other types of solid or stranded wire or cable, for example, copper or aluminum, can also be implemented in the system 10. The first set of emission wires 70, the second set of emission wires 80, the third set of emission wires 80' and the fourth set of emission wires 70' may be made of the same material. Alternatively, the first set of emission wires 70, the second set of emission wires 80, the third set of emission wires 80' and the fourth set of emission wires 70' may be made of different materials. In an embodiment, the first set of emission wires 70, the second set of emission wires 80, the third set of emission wires 80' and the fourth set of emission wires 70' may be equipped with circuit breakers. In an exemplary embodiment, the first set of emission wires 70, the second set of emission wires 80, the third set of emission wires 80' and the fourth set of emission wires 70' may be made of stainless steel and may have a diameter of 0.8 mm.

INDUSTRIAL APPLICABILITY

During an operation of the system 10 of the present application, the power source 14 provides voltage to the antenna 12 and generates a flow of current to or from the atmosphere through the first set of emission wires 70. In an embodiment, where the antenna 12 includes the second set of emission wires 80, the third set of emission wires 80' and/or the fourth set of emission wires 70', the power source 14 provides voltage to the antenna 12 and generates a flow of current to or from the atmosphere through the first set of emission wires 70, the second set of emission wires 80, the third set of emission wires 80' and/or the fourth set of emission wires 70'. The level of emission or absorption of electrons to or from atmosphere is controlled according to the sign (positive or negative) and level of voltage supplied from the power source 14 to the wires 70, 70', 80 and/or 80' and results in the level of electrization of atmosphere. The electrons become the centers of condensation of water molecules (dipoles) which are attracted to electrons and change their state from vapor to liquid form thus releasing heat energy. Altering the volume of electrons in the atmosphere allows controlling meteorological processes in the atmosphere such as limiting or increasing precipitation, eliminating air pollution (decreasing AQI, air quality index), strengthening or weakening the wind in the controlled area.

The system 10 of the present application provides an advantage over the conventional device. Unlike the conventional system, in the antenna 12 of the present application, the emission wires 70, 70', 80 and 80' are stretched in a manner, for example horizontally and vertically, such that the emission wires 70, 70', 80 and 80' are arranged along the tower 20, for example 90 degrees apart from each other, between the at least one first and second rods 42, 62 at two levels or heights, thereby increasing the emissivity of the electrons in the atmosphere.

In an embodiment, the height $H_T$ of the tower 20 may vary from 60 meters (m) to 100 m, and at least a threshold gap between the emission wires 70, 70, 80 and/or 80' may be maintained for the emission of electrons along the entire length of the emission wires 70, 70, 80 and/or 80'. Said arrangement increases the emissivity of the emission wires 70, 70, 80 and/or 80', with the result that an overall operable length of the emission wires 70, 70, 80 and/or 80' increases severalfold. As a result, the level of electron emission into or from the atmosphere from a single installation is sufficient for limiting or increasing precipitation, eliminating air pollution (decreasing AQI, air quality index), strengthening or weakening the wind in the controlled area.

In an exemplary embodiment of the system 10, the height $H_T$ of the tower 20 may be 70 m, and the square cross section of each of the plurality of blocks 22 forming the tower 20 may be 2×2 m². In an embodiment, the height H1 of the first structure 40 or the at least one first rod 42 may be 68 m above the ground 100, and the height H2 of the second structure 60 or the at least one second rod 62 may be 7 m above the ground 100. Also, the number N of the at least one first and second rods 42, 62 in each of the first structure 40 and the second structure 60 may be 8, and the length L of each of the at least one and second rods 42, 62 may be 20 m. In an embodiment, the height H of the power source 14 may be 8 m above the ground 100, thereby leaving sufficient space for the safe passage of pedestrians and traffic.

LIST OF REFERENCES 10 system
12 antenna
14 power source
16 control unit
20 tower
22 blocks
24 first platform
26 second platform
40 first structure
42 at least one first rod
44 first end
46 second end
50 pivoting structure
52 cable support members
54 winches
56 insulators
60 second structure
62 at least one second rod
64 first end
66 second end
70 first set of emission wires
80 second set of emission wires
80' third set of emission wires
70' fourth set of emission wires
100 ground
L length
H height of power source
$H_T$ height of tower
H1 height of the first structure
H2 height of the second structure
P pin
P1 first plane
P2 second plane

I claim:

1. A system (10) for modifying atmospheric conditions, the system (10) comprising:
a tower (20);
at least one first rod (42) and at least one second rod (62), each of the at least one first rod (42) and the at least one second rod (62) coupled to the tower (20) to extend from the tower (20) and define an end distal (46, 66) from the tower (20), wherein the at least one second rod (62) is spaced apart from the at least one first rod (42) along a height ($H_T$) of the tower (20); and
a first set of emission wires (70) extending between the end (46) of the at least one first rod (42) and the end (66) of the at least one second rod (62).

2. The system (10) as claimed in claim 1, wherein
the at least one first rod (42) corresponds to a plurality of first rods (42) coupled to the tower (20) to extend from the tower (20) and the end (46) of each of the plurality of first rods (42) is defined in a first plane (P1); and
the at least one second rod (62) corresponds to a plurality of second rods (62) coupled to the tower (20) to extend from the tower (20) and the end (66) of each of the plurality of second rods (62) is defined in a second plane (P2) spaced apart from the first plane (P1).

3. The system (10) as claimed in claim 2, including:
a second set of emission wires (80) extending between the ends (46) of two adjacent rods (42) of the plurality of first rods (42); and
a third set of emission wires (80') extending between the ends (66) of two adjacent rods (62) of the plurality of second rods (62).

4. The system (10) as claimed in claim 3, including a fourth set of emission wires (70') extending from one or more emission wires (80) of the second set of emission wires (80) to one or more emission wires (80') of the third set of emission wires (80').

5. The system (10) as claimed in claim 2, wherein the first plane (P1) is parallel to the second plane (P2).

6. The system (10) as claimed in claim 1, wherein a length (L) of the at least one first rod (42) is equal to a length (L) of the at least one second rod (62).

7. The system (10) as claimed in claim 1, wherein, in an extended state of each of the at least one first rod (42) and the at least one second rod (62) with respect to the tower (20), the at least one first rod (42) and the at least one second rod (62) are perpendicular to the height ($H_T$) of the tower (20).

8. The system (10) as claimed in claim 1, wherein the at least one first rod (42) and the at least one second rod (62) are pivotally coupled to the tower (20) using a pivoting structure (50).

9. The system (10) as claimed in claim 1, wherein the first set of emission wires (70) extend between the end (46) of the at least one first rod (42) and the end (66) of the at least one second rod (62) to be parallel to the height ($H_T$) of the tower (20).

10. The system (10) as claimed in claim 1, including
a power source (14); and
a control unit (16) coupled to the power source (14) and adapted to control the power source (14) to supply voltage to the first set of emission wires (70).

* * * * *